(12) United States Patent
Murray et al.

(10) Patent No.: US 11,953,408 B2
(45) Date of Patent: Apr. 9, 2024

(54) METHODS AND DEVICES FOR SAMPLE CAPTURE USING GAS-PULSE NANOPARTICLE DISPLACEMENT

(71) Applicant: Board of Supervisors of Louisiana State University and Agricultural and Mechanical College, Baton Rouge, LA (US)

(72) Inventors: Kermit King Murray, Baton Rouge, LA (US); Fabrizio Donnarumma, Baton Rouge, LA (US); Jamira Stephenson, Baton Rouge, LA (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 31 days.

(21) Appl. No.: 17/743,745

(22) Filed: May 13, 2022

(65) Prior Publication Data

US 2022/0268669 A1    Aug. 25, 2022

Related U.S. Application Data

(63) Continuation of application No. 16/572,201, filed on Sep. 16, 2019, now Pat. No. 11,371,913.

(Continued)

(51) Int. Cl.
*G01N 1/14*    (2006.01)
*G01N 1/38*    (2006.01)

(52) U.S. Cl.
CPC ............... *G01N 1/14* (2013.01); *G01N 1/38* (2013.01); *G01N 2001/1445* (2013.01)

(58) Field of Classification Search
CPC .... G01N 1/14; G01N 1/38; G01N 2001/1445; G01N 1/2205; G01N 1/24;
(Continued)

(56) References Cited

FOREIGN PATENT DOCUMENTS

| CN | 2014028901 | * | 2/2014 |
|---|---|---|---|
| CN | 105259246 | * | 1/2016 |

OTHER PUBLICATIONS

Becue, A.: Emerging fields in fingermark (meta) detection—a critical review. Anal. Meth. 8, 7983-8003 (2016).
(Continued)

*Primary Examiner* — Robert R Raevis
(74) *Attorney, Agent, or Firm* — Thomas|Horstemeyer LLP

(57) ABSTRACT

The present disclosure provides for sampling instruments and methods of collecting sample particles. The sampling instrument can include a high-pressure pulsed valve coupled to a gas flow system to displace a sample from a surface. Also included can be a voltage supply coupled to a voltage switch, a suction device, a sample collector, and a collection filter. To collect a sample, extractive particles can be deposited onto a sample present on a substrate. At least a portion of the sample becomes coupled to a portion of the extractive particles to form sample particles. High-pressure gas can be discharged at the sample, thereby aerosolizing a portion of the sample particles to disperse aerosolized sample particles. A portion of the aerosolized sample particles can be collected onto a collection filter to form a collected sample.

11 Claims, 14 Drawing Sheets

Related U.S. Application Data

(60) Provisional application No. 62/732,331, filed on Sep. 17, 2018.

(58) Field of Classification Search
CPC ....... G01N 2001/241; G01N 2001/247; G01N 1/08; G01N 1/405; G01N 2001/022; G01N 2001/028; G01N 1/02
USPC .......................... 73/864.33, 863.23; 250/425
See application file for complete search history.

(56) References Cited

OTHER PUBLICATIONS

Couper, F., Gluodenis, T., Jensen, M., Klee, Neufeld, M., L., Quimby, B., Zarwell, L., Zweigenbaum, J., Forensic Applications of New Analytical Technologies, Forensic Mag. 2, 20 (2005). [Abstract] Available at: https://www.ojp.gov/hcjrs/virtual-library/abstracts/forensic-applications-new-analytical-technologies (Accessed: Jun. 10, 2021).

Donnarumma, F., Camp, E.E., Cao, F., Murray, K.K.: Infrared Laser Ablation with Vacuum Capture for Fingermark Sampling. J. Am. Soc. Mass Spectrom. 51, 1-9 (2017).

James, N., DNA Testing in Criminal Justice: Background, Current Law, Grants, and Issues, CRS report for Congress, 2012, Diane Publishing.

Romolo, F.S., Cassioli, L., Grossi, S., Cinelli, G., Russo, M.V.: Surface-sampling and analysis of TATP by swabbing and gas chromatography/mass spectrometry. Forensic Sci. Int. 224, 96-100 (2013).

Van Oorschot, R.A., Ballantyne, K.N., Mitchell, R.J., Forensic trace DNA: a review, Investig Genet 1, 14-31 (2010).

Wei, Q., Zhang, M., Ogorevc, B., Zhang, X.: Recent advances in the chemical imaging of human fingermarks (a review). Analyst. 141, 6172-6189 (2016).

Bradshaw, R.; Denison, N.; Francese, S., Implementation of MALDI MS profiling and imaging methods for the analysis of real crime scene fingermarks. Analyst 2017, 142 (9), 1581-1590.

Vickar, T.; Bache; Daniel, B; Frascione, N., The use of the M-Vac® wet-vacuum system as a method for DNA recovery. Science & Justice 2018, 58 (4), 282-286.

* cited by examiner

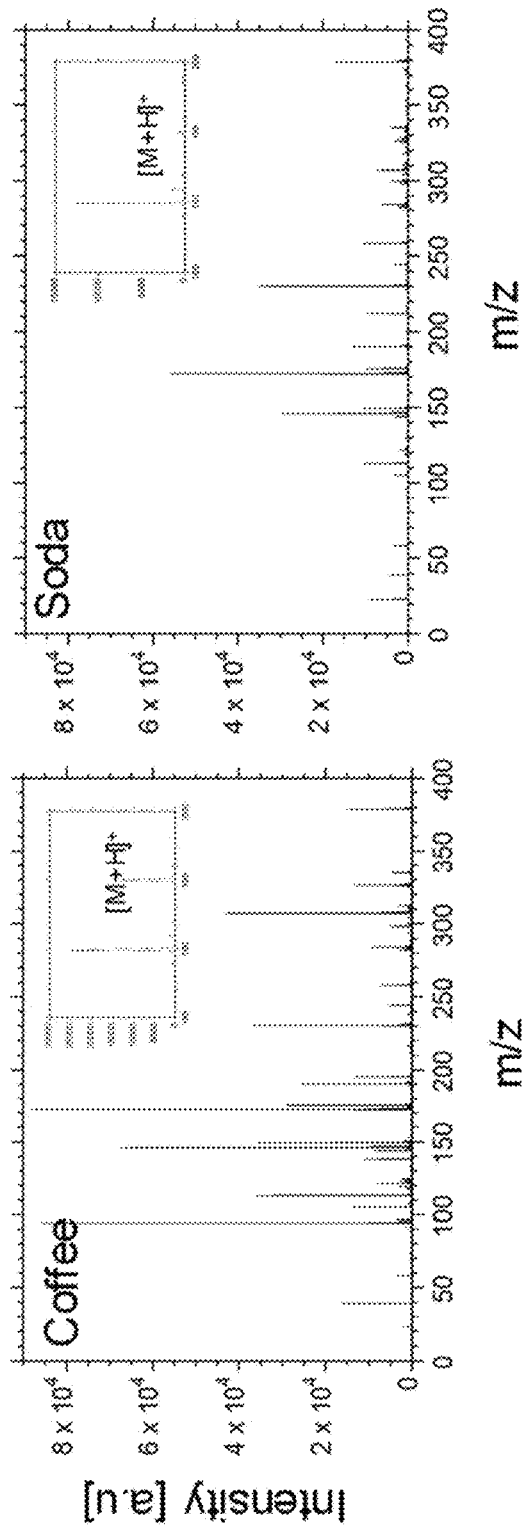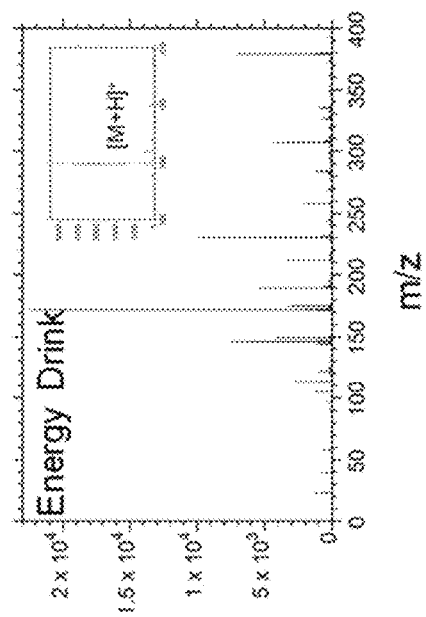
Fig. 7A
Fig. 7B
Fig. 7C

METHODS AND DEVICES FOR SAMPLE CAPTURE USING GAS-PULSE NANOPARTICLE DISPLACEMENT

CROSS-REFERENCE TO RELATED APPLICATIONS

This application is a Continuation of U.S. application Ser. No. 16/572,201 filed on Sep. 16, 2019, which application claims the benefit of and priority to U.S. Provisional Application Ser. No. 62/732,331, having the title "METHODS AND DEVICES FOR SAMPLE CAPTURE USING GAS-PULSE NANOPARTICLE DISPLACEMENT", filed on Sep. 17, 2018, the disclosure of each of which is incorporated herein by reference in their entireties.

BACKGROUND

Forensic sampling at crime scenes is typically accomplished by swabbing of hard surfaces or by collecting small pieces of soft porous surfaces such as cloth or carpet. Challenges include collection of small samples or trace evidence. Technologies such as wet vacuum collection have low sampling precision. Laser ablation is a powerful sampling method, but lasers are expensive and unsuitable for general sampling operations.

SUMMARY

Embodiments of the present disclosure provide for apparatus and methods for sampling particles, and the like.

An embodiment of the present disclosure includes a sampling instrument including a high-pressure pulsed valve coupled to a gas flow system to displace a sample from a surface. Also included are a voltage supply coupled to a high voltage switch, a suction device, a sample collector, and a collection filter.

An embodiment of the present disclosure also includes a method of particle sample collection, including depositing extractive particles onto a sample present on a substrate. At least a portion of the sample becomes coupled to a portion of the extractive particles to form sample particles. High-pressure gas can be discharged at the sample, thereby aerosolizing a portion of the sample particles to disperse aerosolized sample particles, which can be about 1 μm or less. A portion of the aerosolized sample particles can be collected onto a collection filter to form a collected sample.

Other compositions, apparatus, methods, features, and advantages will be or become apparent to one with skill in the art upon examination of the following drawings and detailed description. It is intended that all such additional compositions, apparatus, methods, features and advantages be included within this description, be within the scope of the present disclosure, and be protected by the accompanying claims.

BRIEF DESCRIPTION OF THE DRAWINGS

Further aspects of the present disclosure will be more readily appreciated upon review of the detailed description of its various embodiments, described below, when taken in conjunction with the accompanying drawings.

FIG. 3A is a blank sample (Negative control); FIG. 3B shows caffeine captured with the method described in FIG. 2; FIG. 3C shows spectrum of caffeine standard (positive control).

FIGS. 7A-7C provide MALDI mass spectra of material captured from a t-shirt material upon which different beverages had been spilled. Inserts show signal from caffeine, which was present in all beverages tested.

FIG. 8A provides spectrum from a sampled fingermark that was left on a piece of cloth right after touching a lubricated condom; FIG. 8B provides spectrum from a sampled fingermark that was left on a piece of cloth right after coming into contact with an antiseptic cream containing bacitracin peptides.

Figure 1:
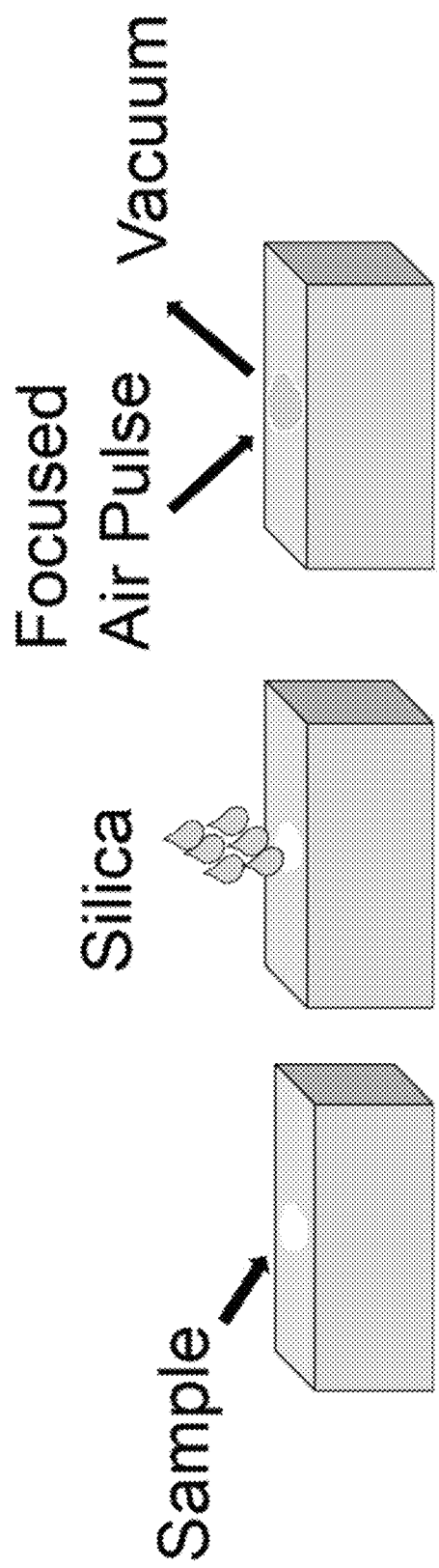
FIG. 1 is a schematic of an example method for collecting a sample. The label "silica" is intended as "suspension of silica nanoparticles".

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles.

DETAILED DESCRIPTION

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, material science, forensic science, physics, and the like, which are within the skill of the art.

The following examples are put forth so as to provide those of ordinary skill in the art with a complete disclosure and description of how to perform the methods and use the devices disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise.

General Discussion

In accordance with the purpose(s) of the present disclosure, as embodied and broadly described herein, embodiments of the present disclosure, in some aspects, relate to devices and methods for the collection of samples e.g. small molecules, DNA, and other relevant chemical and biological compounds.

In general, embodiments of the present disclosure provide for methods of collecting particles (e.g. particles from nanoscale to microscale) of a sample and products including devices for collecting particles.

The present disclosure includes a sampling device using particle dusting to extract chemical compounds from a sample and pulsed valve filter aspiration to collect the compounds for lab analysis. Advantageously, the device is portable and can be used for both small molecule and DNA detection. In an aspect, the device can include a high-pressure pulsed valve coupled to a gas flow system which displaces (e.g., aerosolizes) particles of the sample from a surface. The device can include a voltage supply coupled to a switch to pulse the gas. In another aspect, the pulsed valve can be a fuel injector valve (such as one normally intended for gasoline) with the high pressure gas. The fuel injector valve may be slower and/or less precise than the high-speed pulsed valve, but advantageously can be about less than one-tenth the cost of the high speed valve and operated on a 12 volt circuit.

In an aspect, the device can include a suction device for collecting the displaced sample particles. The sample particles can be collected into a sample collector containing a collection filter. In another aspect, the collection device could be an inertial impactor type collection device. The sample collector can include a consumable/disposable portion (such as a tip) containing the filter to avoid cross-contamination when collecting more than one sample. In an aspect, the sample collector can be e.g. a wand, hose, tube, or a syringe. In various aspects, the sampling instrument can include one gas dispensing apparatus (e.g. a wand, hose, gas duster, or tube) connected to the gas supply for dispensing the gas, and another wand, hose, syringe, or tube connected to the vacuum for sample particle collection. In other aspects, the gas dispensing apparatus and the sample collector can be housed together in one wand. The sampling instrument can also include a storage apparatus for storing the collected particles for analysis in appropriate conditions to prevent or reduce contamination and/or degradation.

In various aspects, the gas flow system includes a high-pressure gas dispenser. The gas dispenser can be a gas cartridge, a gas canister, or a refillable gas cylinder. Any suitable gas can be used, including compressed air, or other high-pressure gases, such as He, Ar, $N_2$, and the like.

In various aspects, the high-pressure pulsed valve can operated by a battery for portability and remote usage. The same power source or a different power source may be used to control the vacuum pump. The instrument can also be configured to use local AC power (or vehicle power) exclusively or as a backup for the battery(ies). The gas flow system can be dispensed at a pressure of about 10 PSIG to about 100 PSIG. In various aspects, the pulsed valve can operate at a pressure of about 10 psi to about 100 psi and a pulse repetition rate from single shot to about 100 Hz.

The samples of interest for collection can be biological compounds, other organic compounds, and inorganic compounds. Examples include, but are not limited to DNA, proteins, drugs, components of an explosive mixture, and other chemical compounds.

The sampling instrument can include a particle dispenser, which can dispense extractive particles that bind to (or otherwise couple) the sample prior to gas pulse-assisted sample collection. In some aspects, the dispensed extractive particles can be silica particles, or silica nanoparticles. Silica is simple, inexpensive, and is one of the traditional materials for chromatographic separation. Other materials for chromatographic separation (stationary phase materials) or chemically modified nanoparticles that selectively bind analytes of interest may be dispensed. Particles can be functionalized with surface ligands, antibodies, or DNA to facilitate selective binding to certain analytes (e.g. target specific proteins, genomic material).

In various aspects, the sampling can include a solvent dispenser. A solvent can be applied to the sample of interest to assist in collection. Solvent application may be particularly useful for dried samples. Wet samples (e.g. fresh blood, bodily fluids, lotions, liquid spills) may not require a solvent. In some aspects, the solvent can be an organic solvent (e.g. ethanol).

In some aspects, the solvent and the dispensed particles can be dispensed simultaneously, for example as a suspension or solution. Other reagents can be included in the solution.

Embodiments of the present disclosure include a method of particle sample collection as above, wherein silica particles (or other extractive particles capable of being a carrier particle for the sample compounds to be detected and analyzed) can be deposited onto a sample, whereby some of the sample compounds/particles couple to or otherwise adhere to a portion of the extractive particles, such that some of the particles contain sample. High-pressure gas is then discharged at the sample, thereby aerosolizing a portion of the particles containing sample ("sample particles") to disperse aerosolized particles containing compounds from the sample. A portion of the aerosolized sample particles can be collected onto a collection filter.

Described herein is a novel pulsed-valve nanoparticle displacement capture device that, in embodiments, uses nanoparticle dusting to extract chemical compounds from a sample and pulsed valve filter aspiration to displace sample compounds from the sample (e.g., on a substrate) and collect the compounds for lab analysis. The pulsed-valve nanoparticle displacement capture device is robust and low cost yet fast, efficient, and versatile. The devices and methods described herein can be used in various settings, including in forensic investigations, such as collecting trace evidence from a crime scene, among others. Sample collection at a crime scene can be conducted by several entities, including law enforcement agents and members of crime scene investigation units. Sampling of molecules such as explosives may lead to application of the technology in other fields such as warfare and security screening. Collection of evidence plays an important role both in case investigations as well as evidence evaluation during trial. The pulsed valve nanoparticle capture technology described herein is superior to existing devices because it is faster, more precise, and allows for collection with lowered risk of contamination of virtually any substance from virtually any surface. After collection, the collected sample can be stored in a contamination-free environment at a temperature suitable for preservation.

There is a growing societal need for improved forensic sampling methods. Forensic science is central to the criminal justice system, and rapid, efficient, and accurate methods are critical to the swift and fair application of the law. Benchtop analysis methods have greatly improved both in speed and sensitivity, yet the methods for collection of samples in the field have remained the same for decades. Sampling technology must advance to keep pace with analysis technology.

The pulsed valve nanoparticle capture methods and devices described herein provide several advantages over existing technologies (e.g. swab-based methods and wet-vacuum) for trace evidence collection. First, the device provides improved sensitivity for trace analyte sampling. For example, swab-based methods cannot handle limited areas and often result in recovery of less than half of the available sample (van Oorschot 2010). The methods and devices of the present disclosure can sample a surface with high precision on the millimeter size scale. Trace evidence can be sampled from challenging and porous surfaces (e.g. cloth, carpet, paper, wood, glass, plastic, concrete, felt, etc.) without damage or the need for removing portions of the surface. Additionally, the samples can be collected with little to no contact, reducing the potential for contamination. In addition to other types of samples, trace DNA sampling can also be achieved, which is an increasingly important component of crime scene investigation.

The devices and methods of the present disclosure can reduce operator-dependent variability in sample collection and can thereby reduce false negatives in the analysis. Direct analysis of the collected sample can be achieved with minimal extraction steps. The portable device can be a cost-effective solution to the forensic sampling problem.

Pulsed-valve nanoparticle displacement capture technology is a departure from forensic trace analysis by surface swabbing, which is the current gold-standard and dates back to the earliest days of forensic science. The methods and devices described herein provide non-contact and non-destructive means for sample collection that are just as easy to perform, if not easier than, current swabbing methods. Furthermore, swab methods are difficult to use with porous surfaces such as cloth or carpet. The pulsed-valve nanoparticle displacement capture technology is thus applicable to a wider range of substrates and applications and provides greater investigative information. These elements combine to enable a better application of forensic analysis and thus greater public safety.

A variety of analytical instruments are available in forensic laboratories that have high sensitivity and are capable of analyzing sample amounts below the nanogram range, which is critical for criminal investigations (Couper 2005). At the same time, evidence collection technology has not kept up with the technological needs for sampling at this level and with innovations primarily directed at sample preservation. The majority of trace samples are currently collected using swabs (van Oorschot 2010), but chemical species such as explosives, drugs, and DNA can be present in amounts as low as a few nanograms in small areas where swabs cannot reach. Novel approaches that rely on wet vacuum aspiration such as the M-Vac system (M-Vac Inc.) have the same limitations. The proposed technology aims to improve sampling, especially where the available surface is limited.

FIG. 1 shows a schematic of an embodiment of the sample collection process. The sample can be on a substrate having a smooth surface (e.g., hard flooring, desk, glass) or an irregular surface (e.g. carpet, cloth, wallpaper). Nanoparticles (or extractive microparticles) are dusted onto the sample, and some of the chemical species from the sample (e.g., small molecules, biological particles, other chemical compounds, etc.) adhere to the nanoparticles. A high-pressure pulse of gas then displaces the nanoparticles, which are aspirated and collected onto a filter element. The filters can be collected on site and the collected material can be extracted and analyzed in the lab later. Although the present discussion refers to extractive nanoparticles, microparticles can also be used.

In an aspect of the present disclosure, nanoparticles can be dispersed on the area to be sampled to increase the surface contact with the analyte (e.g. sample) of interest. The analyte of interest binds to the nanoparticles. In some embodiments (e.g., with samples that have dried or otherwise adhered to a surface) a solvent is applied (e.g., sprayed or otherwise dispensed) on the dispersed nanoparticles on the sample to help extract compounds of interest from the surface containing the sample such that the sample compounds are released from the surface and couple to the nanoparticles. A pulsed valve is used to generate a gas-pulse that helps displace and desorb the particulate that now contains sample compounds/particles. In parallel, a suction device including a filter and a containment vessel (e.g., a filter unit connected to a vacuum line) is held close to the sample in order to aspirate and collect the particulate. The trapped material can be retrieved from the filter at any moment by eluting it with the desired solvent. The sampling process is sensitive and reproducible. In an aspect, the filter can be removed from the containment vessel (or sample collector) and sealed with a plastic cap and stored for transportation and storage under conditions appropriate to prevent degradation or contamination of the collected material. The collected samples can be submitted to forensic labs for further analysis. Later analysis can be accomplished by any of a number of forensic analytical methods, for example mass spectrometry or DNA/protein sequencing.

Embodiments of devices and methods of the present disclosure utilize a high pressure pulsed valve in conjunction with extractive particles, which can collect and remove a sample from a surface with spots ~1 mm. Molecules of the sample bind to the extractive particles (e.g. silica nanoparticles) and the resulting particles are removed by the gas pulse (similar to the way that an absorbent solid such as cat litter is used to clean up a chemical spill). This makes the pulsed-valve nanoparticle displacement capture technology the first portable precision-sampling device for criminal evidence recovery. The portability and, in embodiments, battery operation of the device allows for collection at sites that are difficult to access, remote, or without access to power supply. The removal process produces nanoparticles that can be captured by a suction device (e.g. vacuum aspiration) and collected on a filter. The filters can be easily exchanged for a new sample collection. Capping or sealing the filter results in complete isolation of the sample, which translates in lower chances of contamination and/or degradation. In various aspects, sampling of evidence such as a latent fingerprint can be achieved in less than one minute. Moreover, few, if any, extraction steps are required by this, further reducing sample handling time and chances of evidence damage or contamination (Dale 2006).

Figure 2:
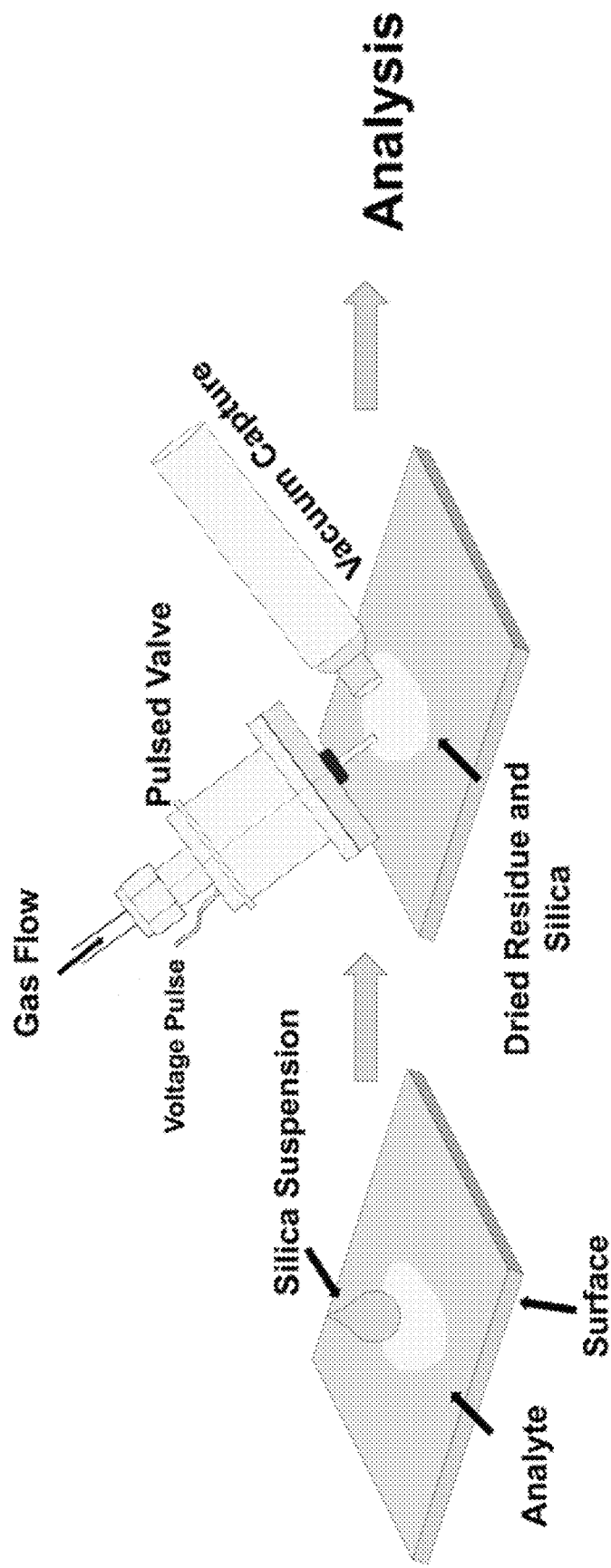
FIG. 2 is an example of an embodiment of a pulsed valve nanoparticle sampling apparatus and/or method.

A schematic of one possible embodiment of a device of the present disclosure is shown in FIG. 2. In general, a sample of interest is present on a surface. In an aspect, nanoparticles, such as a silica suspension, can be deposited onto the sample of interest. The sample can be dried or wet residue. In some aspects, after deposition of the nanoparticles, a solvent can be applied (e.g. sprayed, misted) to the sample to assist adherence of the sample to the nanoparticles. High pressure gas is directed at the sample via a pulsed valve controlled by a voltage pulse. The pressure of the gas dislodges nanoparticles of the sample, which are aspirated by vacuum capture and collected onto a filter (not shown) for analysis. In one aspect, the device can include a nanoparticle dispenser. In another aspect, the nanoparticles are deposited by a separate dispenser. In an aspect, a solvent can be added to the sample prior to discharging the gas to assist in the extraction of the sample. In an aspect, the device can include a solvent dispenser. In an aspect, the nanoparticles and the solvent be dispensed simultaneously (i.e. mixed together and dispensed). Those of skill in the art will understand how to select a solvent appropriate for the sample to be extracted and/or the substrate on which the sample resides.

In various aspects, the sample can include biological materials, bodily fluids, or secretions which may include biological organic compounds such as, but not limited to DNA, peptides, or proteins (e.g. blood, semen, saliva, sweat, latent fingermarks or earmarks, and mucosal secretions), or non-biological materials (e.g. drugs, explosives, fibers, liquids, creams, soil, organic matter, or non-organic matter) as can be envisioned by one skilled in the art.

In various aspects, the surface containing the sample can be porous, semi-porous or non-porous. Surfaces may include, but are not limited to, cloth, carpet, upholstery, paper, wood, plastic, plaster, glass, concrete, felt, metals, sealed wood, painted surfaces, and the like.

In one aspect, a sampling head coupled to the sampling wand can allow the operator to bring gas and vacuum lines near the sample surface. The vacuum line could extend partially outside of the handle to allow exchange of the filter. The sampling head can work as a "pen" that passes over the sample, removing the material and capturing it on the filter through the vacuum line.

In an aspect, the device, including both the wand and the briefcase could weigh 11 kg/25 lbs or less.

In an aspect, the nanoparticles (or other extractive particles) can be dusted onto the sample separately. In another aspect, the device can include a nanoparticles dispenser. The voltage supply can be a disposable battery or can be a rechargeable energy supply (e.g. a lithium cell such as the type used in electrical power tools, or a small lead acid battery). In an aspect, the device may be configured to be supplied by a voltage supply such as local AC power, vehicle DC power, or external generators, which are part of the standard equipment of most investigation units.

In various aspects, the pulsed valve can be a solenoid valve such as those used for precision control of laser spectroscopy gas analysis. Alternatively, fuel injection valves such as those used for standard automobile fuel injection can be used. These valves can be driven by a 12 V DC pulse and are robust and easily acquired. Fuel injection valves are suitable for high pressure gas use and were routinely used as a pulsed gas source in the early days of jet cooled spectroscopy.

In various aspects, the high pressure gas supply can be high pressure carbon dioxide gas. Suitable sources may include small tanks (approximately fist sized) such as those used for paintball guns, bicycle tire inflation, and the like, as well as larger tanks (approximately fire extinguisher sized) such as those that are used for soda machines, beer kegs, and automobile tire inflation, and the like. In various aspects, compressed air or other high-pressure gases, such as He, Ar, or $N_2$, could be used.

In an aspect, the vacuum supply (vacuum pump) can be a mechanical pump or a small vacuum device (e.g. pumps used in vacuum food sealers, high-end coffee machines, and the like) providing enough vacuum to draw particulate material into the filter.

The filter can be any type of particulate filter, impactor, or impinger. Filter materials include glass fiber, mixed-cellulose esters (MCE), polytetrafluoroethylene (PTFE), and polycarbonate capillary pore. In an aspect, the filter captures samples aspirated by nanoparticle gas-pulse displacement at the microgram-deposited level. In an aspect, the filter can be disposable syringe filter that can be connected using such as Luer lock fittings connected to 1.6 mm outer diameter tubing. In other aspects, a pop-in/pop-out filter set-up can be used for fast operation.

In various aspects, about 10 to about 200 samples, about 20 to about 175 samples, or about 50 samples can be collected per gas tank.

In various aspects, viable DNA can be collected at the picogram level.

In an aspect, the pulsed valve has a first gas flow port and has an inlet and an exit. The first gas flow port has a closed position and an open position. The pulsed valve has a gas inlet configured to connect to a gas source. The gas inlet is in gaseous communication with the inlet of the first gas flow port. When the first gas flow port is in the closed position, gas does not flow through the first gas flow port, and when the first gas flow port is in the open position gas flows through the inlet and out of the exit of the first gas flow port. The pulsed valve can also include a mechanism (e.g., actuation) to control the opening and closing of the first gas flow port so that the gas can be pulsed for a controllable time frame and controllable rate. In addition, the pulsed valve can include other components to control the gas flow, gas pressure, and the like. In an embodiment, the pulsed valve can include a first gas flow port and a second gas flow port or additional gas flow ports. In an aspect, the pulsed valve can be made of stainless steel, steel, aluminum, plastic, or a combination thereof.

In various aspects, the pulsed valve can be a solenoid valve such as a Parker Series 9 solenoid valve sold by Parker Hannifin or other similar solenoid valves. In an aspect, the solenoid valve can have an exit orifice diameter of about 0.25 to about 1 mm.

In various aspects, the opening and closing of the first gas flow port of the pulsed valve (also can be referred to as opening and closing of the pulsed valve or solenoid valve) can be a pulsing system that uses an electronic pulse to move the first gas flow port from the closed position to the open position. The pulsing system can be an electronic system in communication with the pulse valve where a voltage can be used to actuate the opening and closing of the pulsed valve. In an aspect, the pulsed valve is connected to a power supply, and the power supply actuates the valve via a switch. In various aspects, the high voltage switch provides at least one pulse of about 200 to about 400 V, or about 280 V. In an aspect, the pulse has a pulse duration of about 250-100 µs and can be pulsed at a rate of single pulse to 200 Hz.

In an embodiment, the sampling instrument includes a gas input (or gas flow) system to supply the gas to the pulse valve. The gas input system is in gaseous communication with the gas inlet of the pulsed valve. The gas from the gas input system can be discharged at a pressure of about 500 kPa to 700 kPa or more. In an embodiment, the gas input system can be left in the open position and the pulse valve can be used to pulse the gas for desired duration and rate.

EXAMPLES

Example 1

Using a device as shown in FIG. 2, the pulsed valve was installed and positioned at a 70-degree angle over a surface (glass, plastic, cardboard, carpet, felt, cotton, wood and paper). The valve was backed with high pressure Argon gas at 90 psi and actuated with a 280 V high voltage pulse of 500 µs. The pulse was provided by a high voltage switch and high voltage power supply driven by a pulse and delay generator. Adjacent to the pulsed valve, a mechanical vacuum pump connected to a syringe and a PVDF membrane filter was held approximately 15-20 degrees above the surface. Analytes (e.g., samples) were dried onto the surface prior to analysis.

Figure 4:
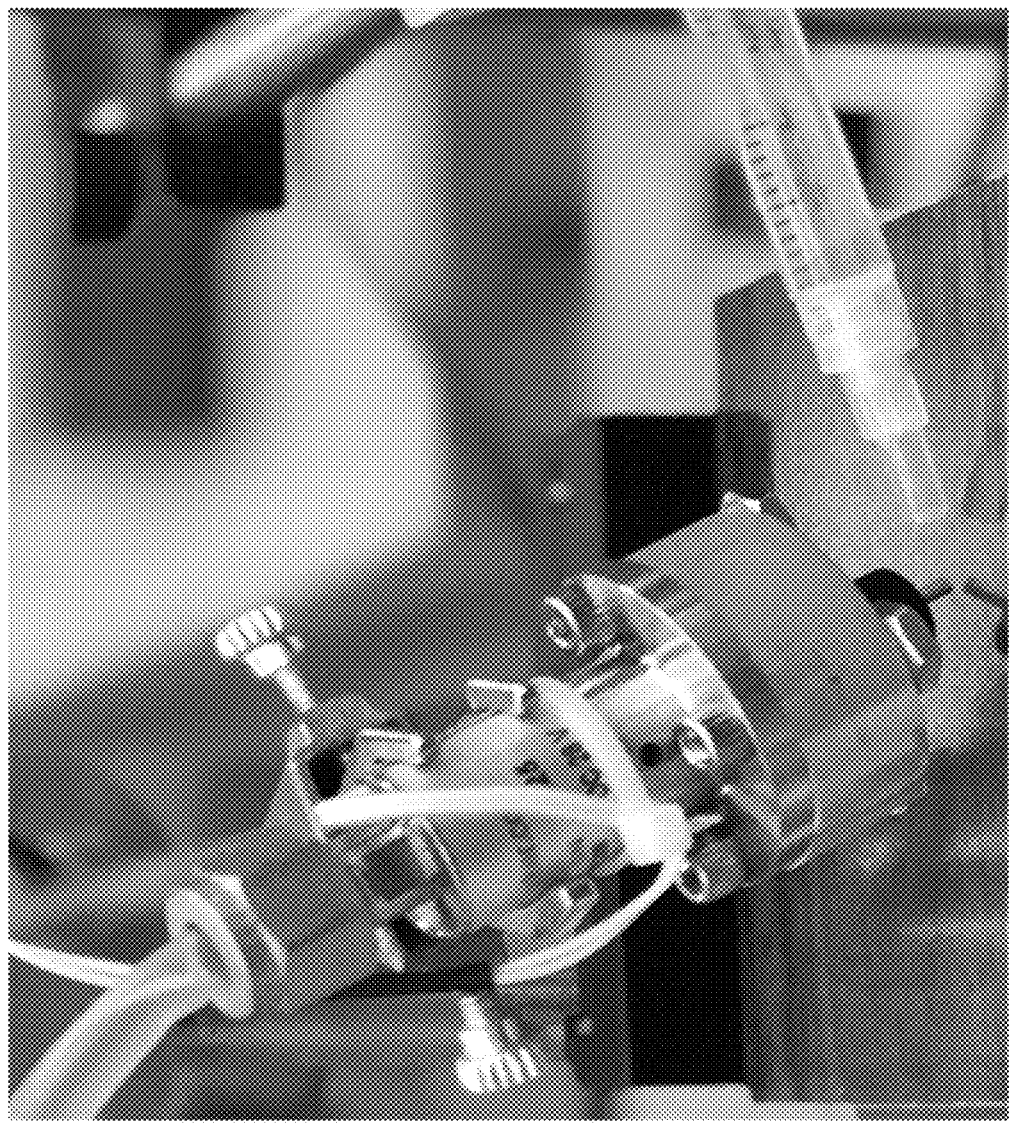
FIG. 4 is a photograph of an example of a pulsed valve nanoparticle sampling apparatus.

A photograph of an example setup is shown in FIG. 4. A small quantity of silica nanoparticles was deposited on various surfaces, followed by a mist of ethanol solvent to assist in the extraction of the surface compounds. Once the solvent was applied, the sample was allowed to air dry for 2-10 min prior to pulsed valve analysis. The time required for drying can be altered depending on the specific analyte and extractive particle, but seconds to minutes will be sufficient in most cases. The pulsed valve was directed at the surface to dislodge the nanoparticles that were then aspirated and collected on a filter. The example in FIG. 4 includes a Parker Series 9 pulsed valve with an additional tube attached to the orifice. The valve was operated at a backing pressure of 100 psi and a pulse repetition rate of 1 Hz. Samples are captured by a suction device, such as a vacuum, on a 0.22 µm PVDF syringe filter. Other components and setups such as type of valves, pressures, pulse repetitions, and the like can be envisioned and optimized for various scenarios by one skilled in the art.

Figures 3A, 3B, 3C:
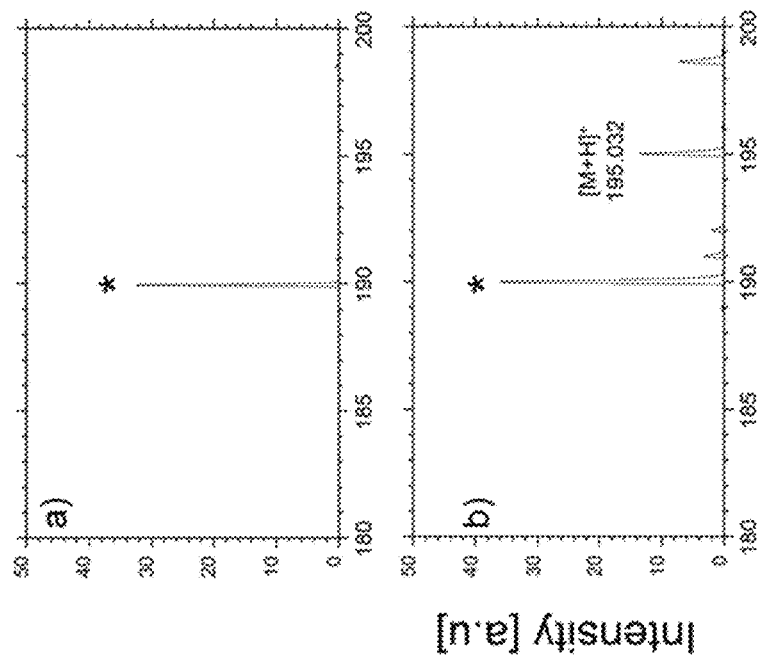
FIGS. 3A-C show mass spectra signals from experimental methods using gas pulse nanoparticle displacement and caffeine.

To determine if the method was successfully able to remove particulate from surfaces, initial testing was done on glass microscope slides using caffeine as a small molecule standard. An aliquot of 2 µg of caffeine was deposited onto the microscope slide, and air dried followed by a nanoparticle suspension. After drying, the glass slide was placed 2 mm under the pulse valve. Approximately 10 pulses at 1 Hz repetition was used and the material removed was captured into a filter via vacuum. The material captured was dissolved in 50 µl of ethanol and water. Samples were then vacuum dried and resuspended in 2 µl of CHCA matrix. The aliquot was deposited on a MALDI target slide and analyzed. The spectra are shown in FIGS. 3A-C. A comparison of results from samples collected with and without nanoparticles are shown. There was no signal from the caffeine, only peaks assigned to the CHCA matrix. FIG. 3A shows an experiment not involving the nanoparticle suspension. No analyte was captured. FIG. 3B shows the experiment when including nanoparticles and there is emergence of captured analyte signal at 195.032. The control is pictured in FIG. 3C. For the positive control, 10 µg of caffeine was directly placed on the MALDI target plate with matrix. This experiment indicated that the addition of nanoparticles aided in the removal of particulate from the glass surface.

In an example, nanoparticles and pulsed valve displacement were used to extract a test sample from various surfaces. A test sample of two micrograms of small molecule standard caffeine (the analyte) was deposited on surfaces including cardboard, carpet, paper, cloth, wood, glass, plastic, and felt (shown in FIG. 5B). The same protocol that was initially used on the glass as described above was applied to all surfaces. In one repetition of the experiment, the analyte sample was extracted without the application of any nanoparticles. In another repetition, each sample was contacted with 20-150 mL of a silica suspension which included 25 mg/mL of 20 nm silica nanoparticles prior to extraction. The caffeine was extracted from all surfaces with varying signal intensities shown in FIG. 5B using gas-pulse nanoparticle capture via the device shown in FIG. 4.

Figure 5A:
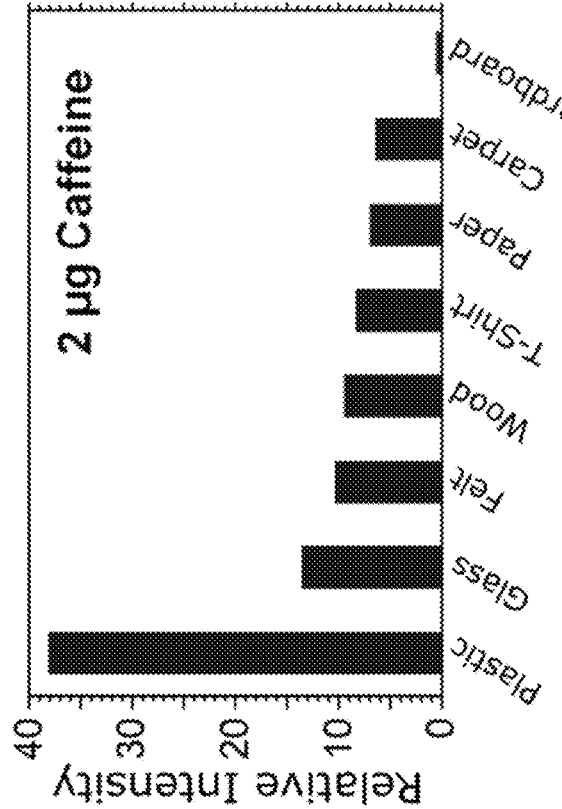
FIG. 5A shows the mass spectra signal intensity of 2 μg of caffeine extracted from various surfaces (FIG. 5B) using gas-pulse nanoparticle capture. Intensities are relative (percentages) of corresponding positive control.
Figure 5B:
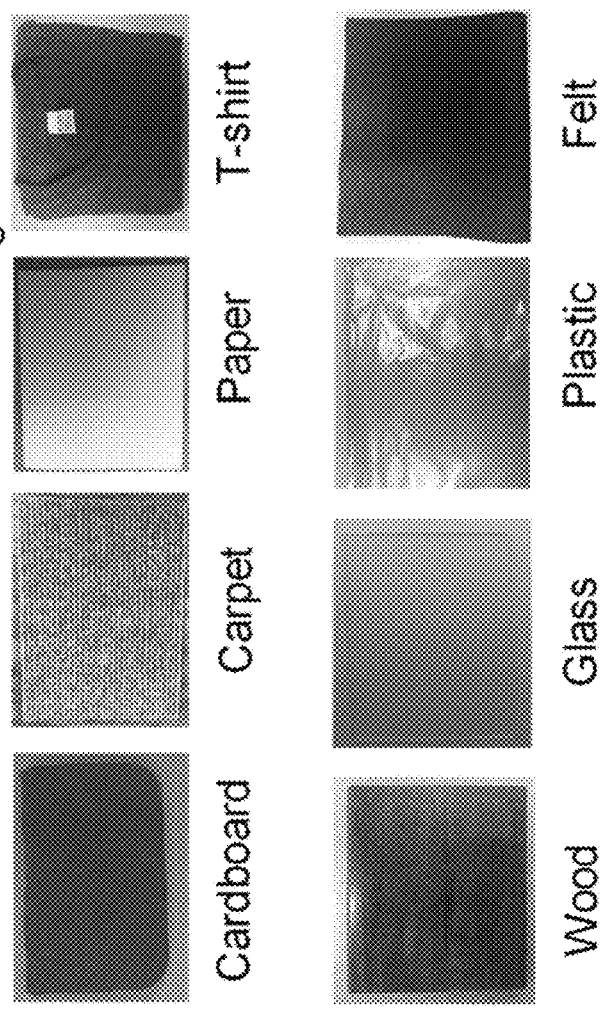

After capture, the collected particles of caffeine were suspended and centrifuged, and the supernatant deposited on a target for MALDI mass spectrometry. FIG. 5A shows the relative intensity of the signal obtained from the sample on each surface when treated with silica. The three non-porous surfaces (plastic, glass and wood) resulted in greater analyte intensities than other porous and semi porous surfaces. Cardboard, a highly porous surface, yielded the weakest intensity of all surfaces.

Figure 6A:
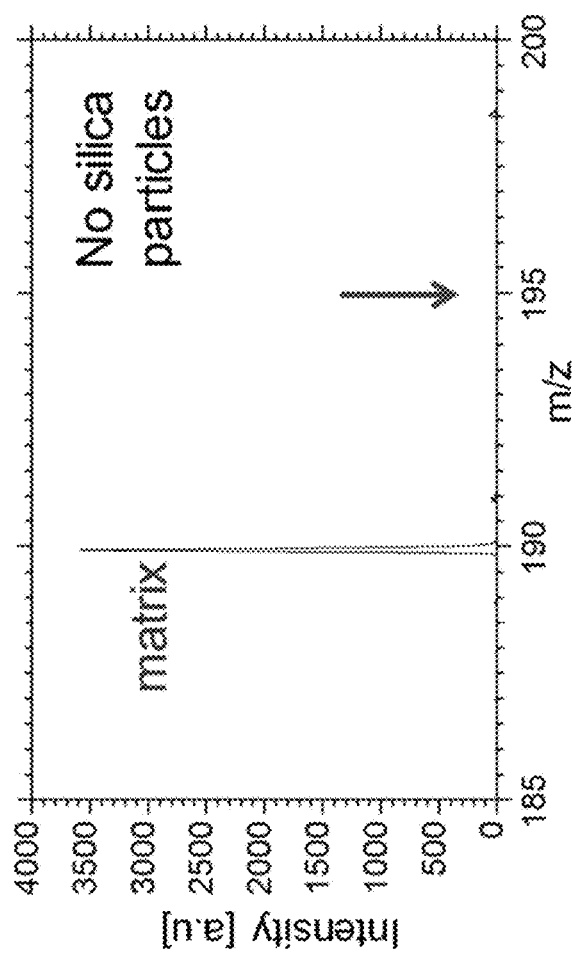
FIGS. 6A and 6B provide mass spectra of a sample collected using gas-pulse capture with (FIG. 6B) and without (FIG. 6A) nanoparticles.
Figure 6B:
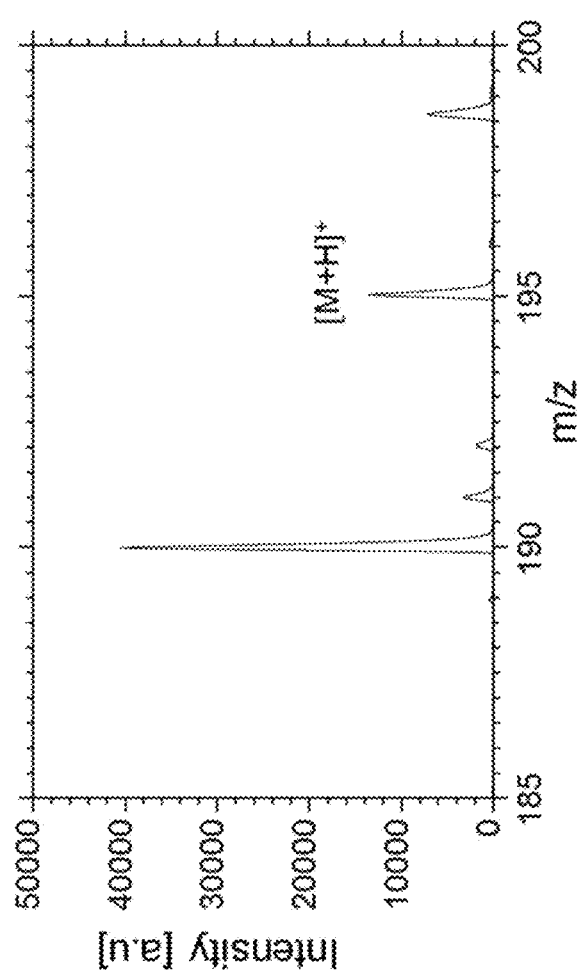

Mass spectra of a collected sample are shown in FIGS. 6A and 6B. FIG. 6A shows a sample with analyte only, while FIG. 6B demonstrates that the addition of the silica particles assisted in extraction. Mass spectra were obtained from a Bruker UltrafleXtreme MALDI mass spectrometer using the matrix α-cyano-4-hydroxycinnamic acid (CHCA) or 2,5-dihydroxybenzoic acid (DHB). Note that this was a convenient mass spectrometer to use but that other techniques such as gas chromatography-mass spectrometry or liquid chromatography-mass spectrometry are equally applicable.

FIGS. 7A-7C show MALDI mass spectra of material captured from a t-shirt upon which different beverages had been spilled (coffee, soda, and an energy drink, respectively) using high pressure pulsed valve methods. Each beverage spill was of a consistent volume (1 μL) and the beverages contained a similar caffeine content. The material was removed via a focused gas pulse and captured in a filter. The material was extracted from the filter with a 50:50 ethanol and water mixture. A portion was taken and placed on a MALDI target using C α-cyano-4-hydroxycinnamic acid (CHCA) as the matrix. Each spectrum is distinguishable from the other and could be used as a "fingermark" of each beverage. In all cases caffeine was detected. As evidenced by the spectra, the high pressure pulsed valve techniques resulted in a distinct, detectable signal from captured particles of caffeine and other small molecule components for each beverage.

Figure 8A:
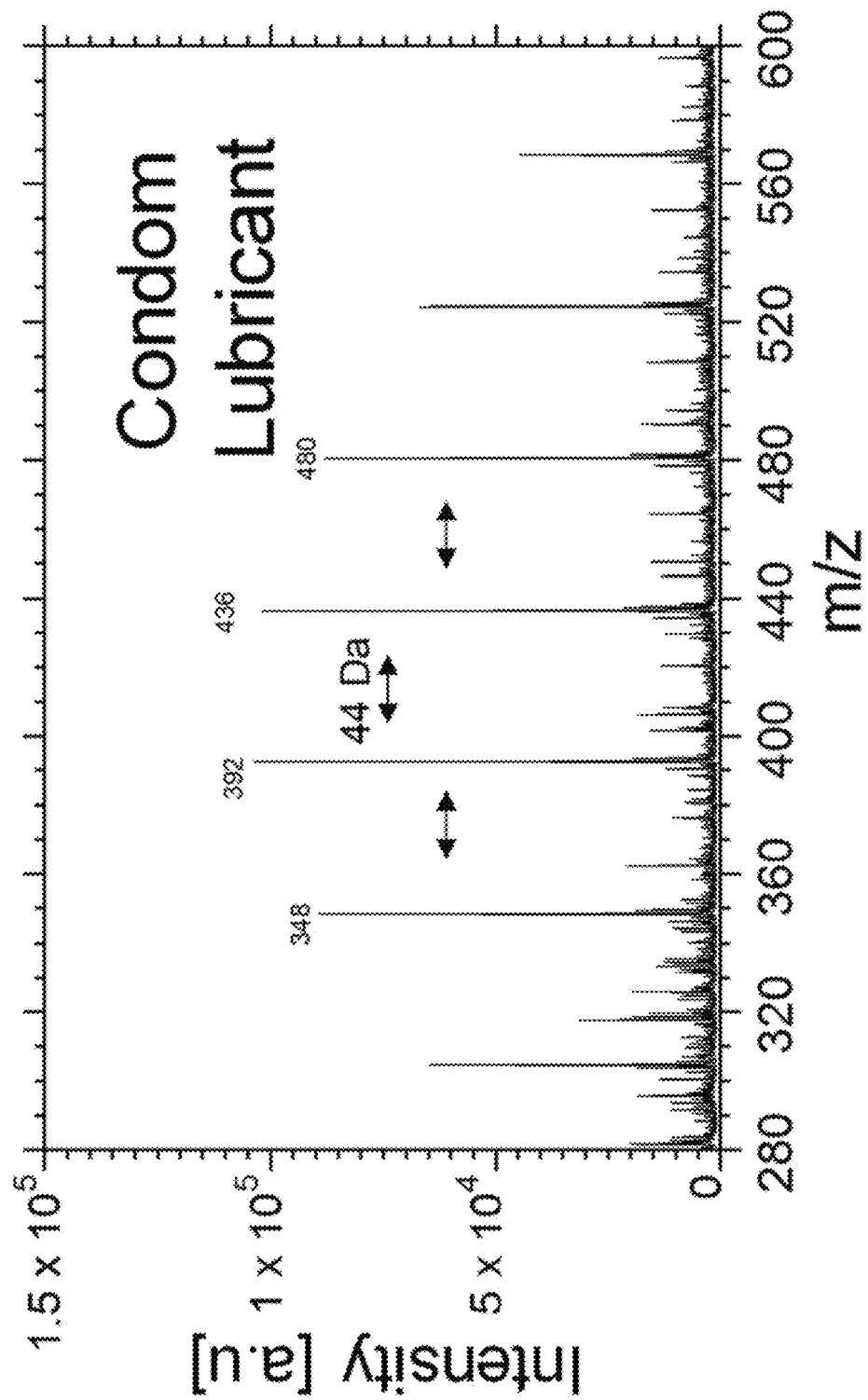
FIGS. 8A and 8B are mass spectra of compounds captured from fingermarks on cloth.
Figure 8B:
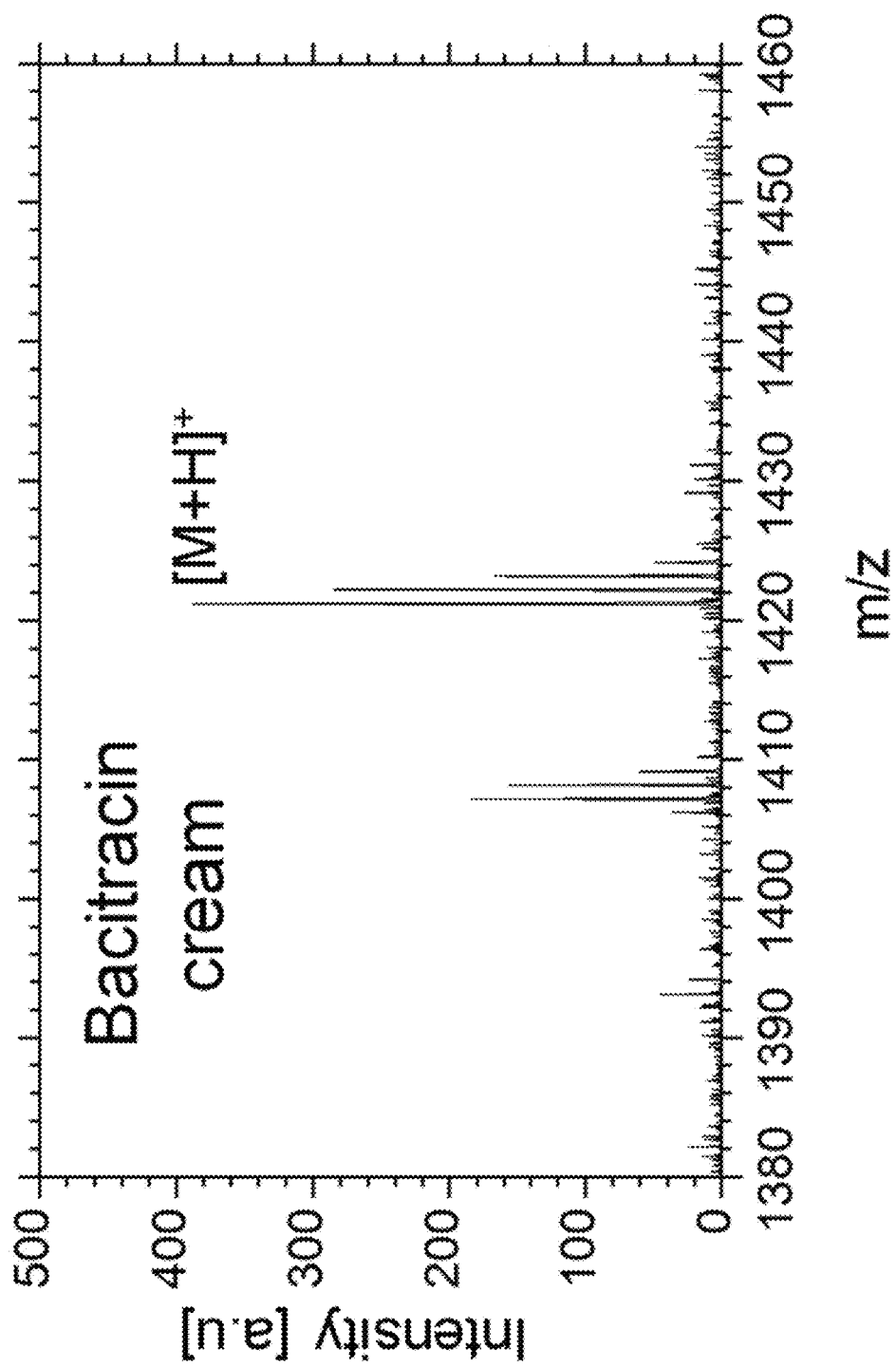

In another experiment, performance of the pulsed-valve nanoparticle displacement capture device was tested on fingermarks on t-shirt cloth, where the fingermarks contained traces of condom lubricant or bacitracin antibiotic cream. The fingermark was exposed to the lubricant of a condom immediately after opening the wrapper. The fingermark was then transferred to the t-shirt and a nanoparticle suspension was applied, followed by pulsed valve displacement and vacuum capture. The captured residue was eluted from the filter with 50 μl of acetonitrile (ACN). An aliquot of the material was deposited onto a MALDI target slide with 2,5-dihydroxybenzoic acid (DHB) matrix. Characteristic peaks spaced by 44 m/z units were present (FIG. 8A), which is indicative of a lubricant a made of a polyethylene glycol (PEG) polymer. A fingermark was deposited on a t-shirt that came into contact with antibiotic ointment Neosporin® (bacitracin), commonly used for topical antibacterial preparations. After the fingermark was placed on the t-shirt, a nanoparticle suspension was applied. After drying, the pulsed valve was used to remove the nanoparticles and analyte materials. The captured samples were eluted in dichloromethane (DCM) and an aliquot was placed on the MALDI slide with C α-cyano-4-hydroxycinnamic acid (CHCA) matrix. The peaks that were detected belonged to the cyclic peptides of the active ingredient bacitracin. The successful capture of the beverage and fingermark samples demonstrate that pulsed-valve nanoparticle displacement capture technology is a viable low-cost replacement for laser ablation sampling.

Figure 9:
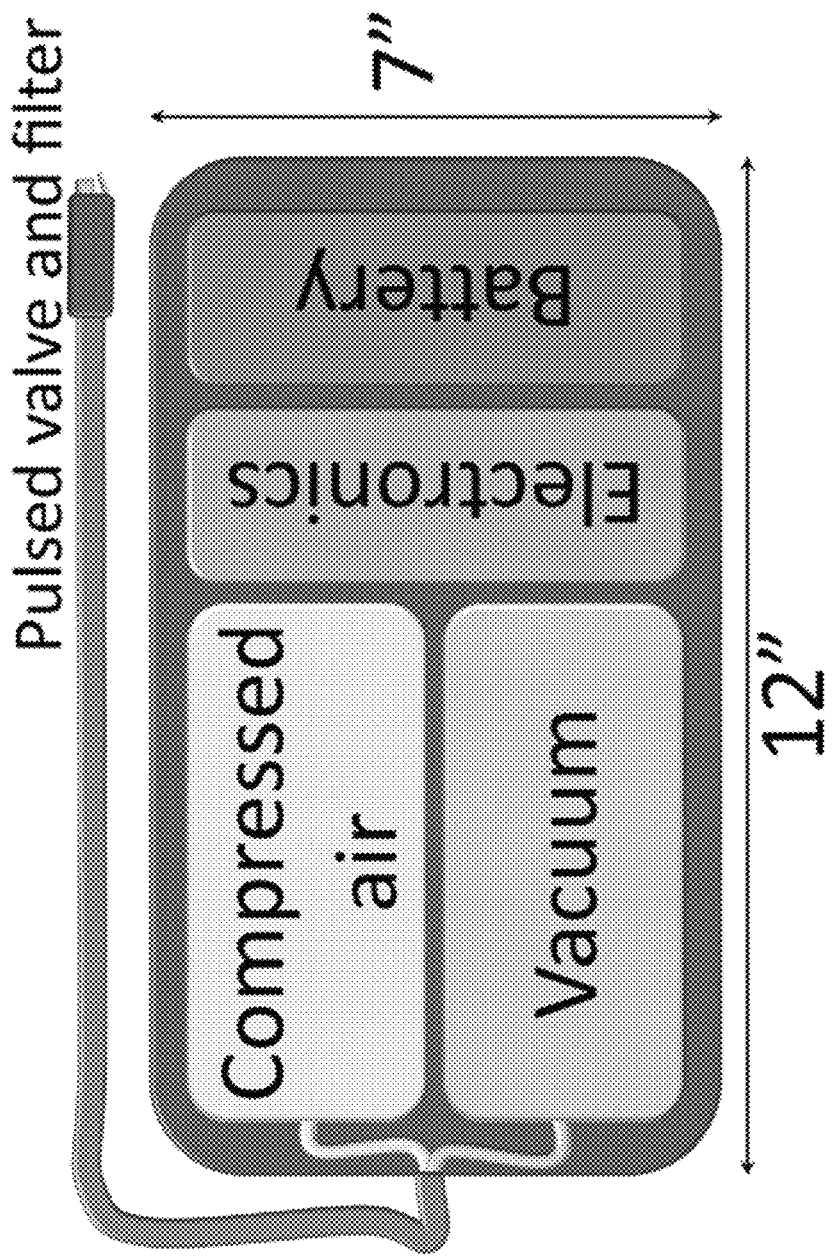
FIG. 9 is a graphical representation of a possible embodiment of the portable gas pulse nanoparticle displacement instrument of the present disclosure for forensic evidence collection.

An example of a portable pulsed-valve nanoparticle capture device is shown in FIG. 9. The dimensions in the figure describe one possible embodiment of the device and is not intended to be limited, nor are the components intended to be to scale. The device can include a high pressure gas supply (compressed air or gas), a vacuum pump, and battery (voltage supply) and/or control circuitry. In an aspect, a sampling "wand" can house the pulsed valve and sampling filter in an external tube connected to the device or housing (aka "briefcase") with a flexible umbilical cable. Although one wand is shown in the figure, in other configurations, separate wands for dispensing the gas and for vacuum collection could be included.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, "about 0" can refer to 0, 0.001, 0.01, or 0.1. In an embodiment, the term "about" can include traditional rounding according to significant figures of the numerical value. In addition, the phrase "about 'x' to 'y'" includes "about 'x' to about 'y'".

Example 1 References

Becue, A.: Emerging fields in fingermark (meta) detection—a critical review. Anal. Meth. 8, 7983-8003 (2016).

Couper, F., Gluodenis, T., Jensen, M., Klee, Neufeld, M., L., Quimby, B., Zarwell, L., Zweigenbaum, J., Forensic Applications of New Analytical Technologies, Forensic Mag. 2, 20 (2005).

Dale, M. W., Nagy, R., Crime Scene and Crime Lab: Joined by Technology; Validated by Quality, Forensic Magazine 3, 16 (2006).

Donnarumma, F., Camp, E. E., Cao, F., Murray, K. K.: Infrared Laser Ablation with Vacuum Capture for Fingermark Sampling Fabrizio Donnarumma, Eden E. Camp, Fan Cao & Kermit K. Murray. J. Am. Soc. Mass Spectrom. 51, 1-9 (2017).

FTM: Forensic Technologies Market (Physical Crime Forensics, Laboratory Forensics, Transportable Forensics, Forensic Tools and Products)—Global Industry Analysis, Size, Share, Growth, Trends and Forecast, 2013-2019, Transparency Market Research, 2013.

GIA: Forensic Technologies and Services, Global Industry Analyst, 2015.

IBIS: The Forensic Technology Services in the US Industry Market Research Report, IBISWorld, Press release, May 2014.

James, N., DNA Testing in Criminal Justice: Background, Current Law, Grants, and Issues, CRS report for Congress, 2012, Diane Publishing.

R&M: Research and Markets: Global Forensic Technologies Market to 2019: DNA Profiling, Biometrics/Fingerprints, Chemical & Firearms ID, Research and Markets, 2013.

Romolo, F. S., Cassioli, L., Grossi, S., Cinelli, G., Russo, M. V.: Surface-sampling and analysis of TATP by swabbing and gas chromatography/mass spectrometry. Forensic Sci. Int. 224, 96-100 (2013)

van Oorschot, R. A., Ballantyne, K. N., Mitchell, R. J., Forensic trace DNA: a review, Investig Genet 1, 14-31 (2010).

Wei, Q., Zhang, M., Ogorevc, B., Zhang, X.: Recent advances in the chemical imaging of human fingermarks (a review). Analyst. 141, 6172-6189 (2016)

Example 2

Figure 10:
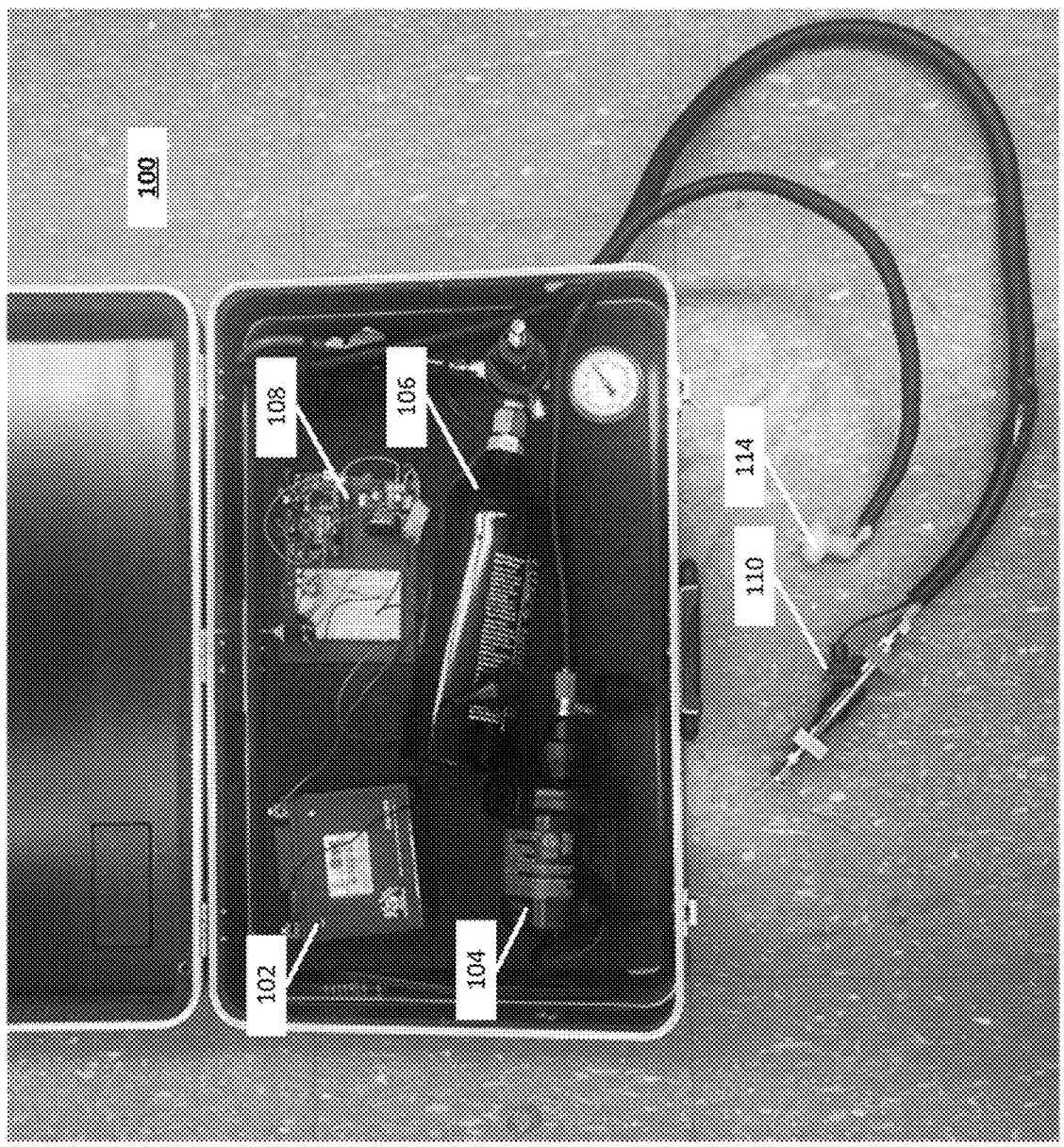
FIG. 10 is a camera image of a possible embodiment of the present disclosure, showing the portable sampling device 100 components: lead acid battery 110; vacuum pump 104; compressed gas ($CO_2$, 20 oz) 106; fuel injection valve controller board 108; and fuel injection valve 110.

A prototype of the portable sampling device 100 (FIG. 10) was built, weighing approximately 8 kg in a 19½×12 in. box. In this example, the fuel injector controller 108 turns the fuel injection valve 110 off and on and pulses the fuel injection valve 110 at 1 Hz repetition rate. The compressed gas tank 106 is used as the supply for the fuel injector 112 which contributes to the amount of pressure released from the valve. The fuel injection valve 110 removes particulate from surfaces via pressurized pulses. The lead acid battery 102 serves as the power supply for both the vacuum pump/vacuum system 104 and the fuel injection valve controller 108. Other power supplies can be envisioned by one of skill in the art. The vacuum pump 104 is connected via a hose to a 25 mm PVDF membrane filter 114 for capture of particulate which is later used for offline mass spectrometry analysis. In other embodiments, the device can include one or more dispensers for solvent or particles. This prototype design enables easy transport, contactless sampling and enables the user to sample surfaces easily.

Figure 11:
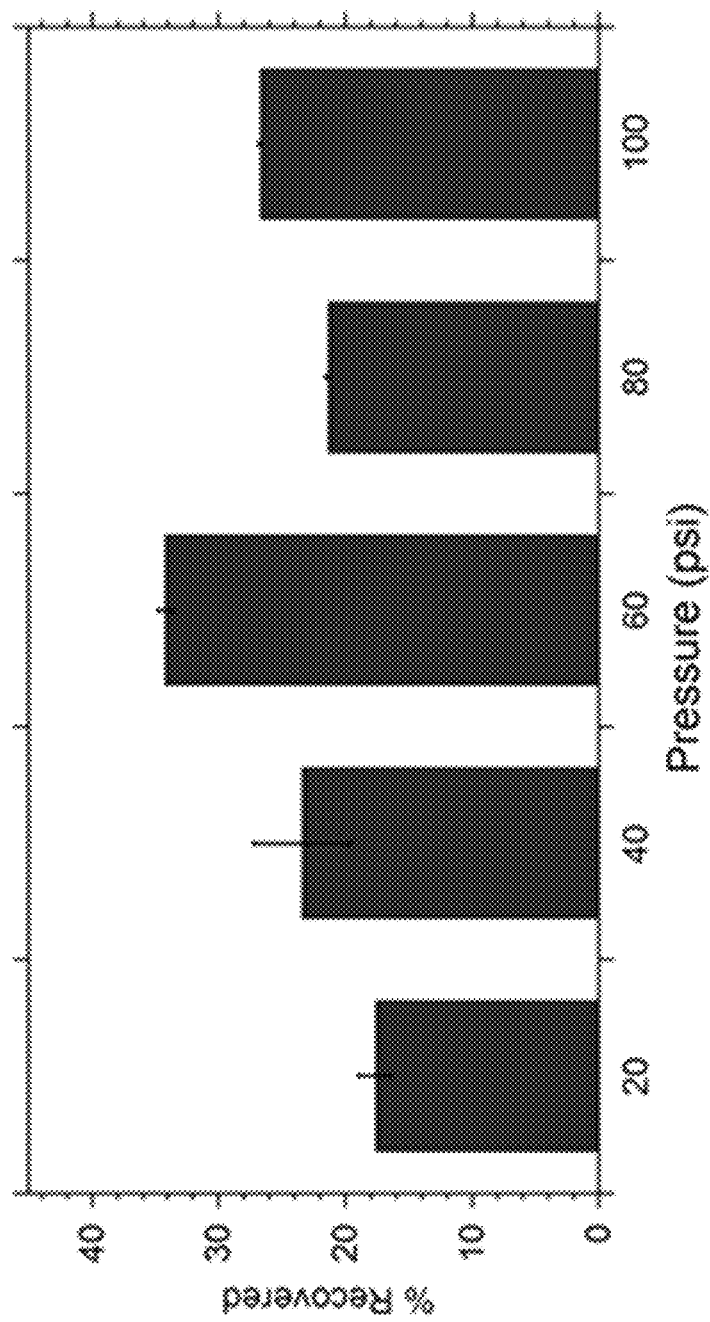
FIG. 11 shows the results of pressure testing using caffeine and 30 μL (25 mg/mL) of 20 nm nanoparticles dissolved in acetonitrile on glass slides. Performed in triplicate.

Performance testing of the described prototype device was conducted. FIG. 11 provides results of pressure testing using caffeine and 30 μL (25 mg/mL) of 20 nm nanoparticles dissolved in acetonitrile on glass slides. Tests were performed in triplicate. The number of shots required to completely remove the material varied from a minimum of 15 (@100 psi) to 30 (@20 psi). 60 was chosen as the pressure for experiments due to the recovery of caffeine being highest at 60 psi.

Figure 12:
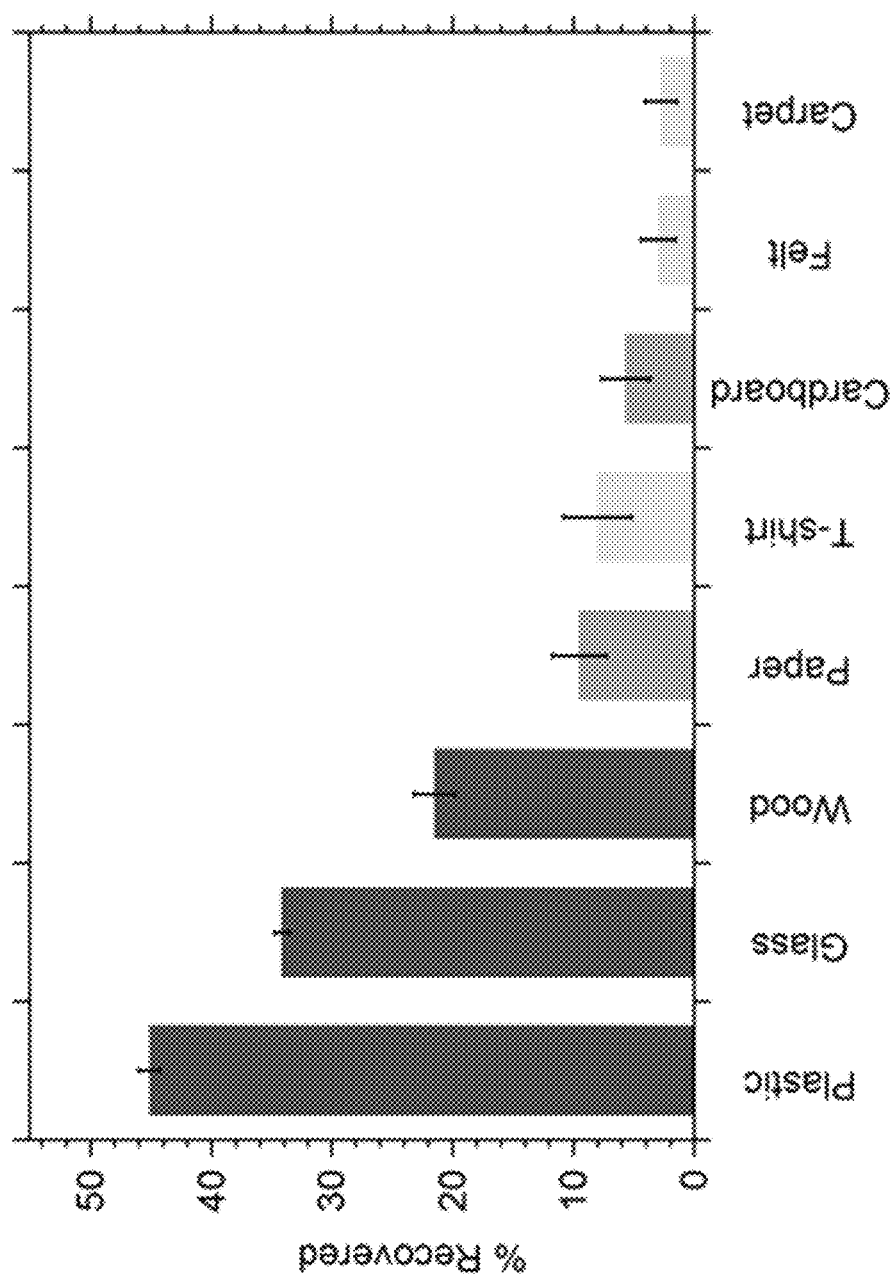
FIG. 12 shows results of surface sampling with the portable fuel injection valve using gas chromatography mass spectrometry to determine recovery of caffeine from samples deposited on glass, plastic, felt, wood, t-shirt, paper, carpet and cardboard. Each sample surface was spiked with 2 μg of caffeine and 20 nm nanoparticle suspension (30 μL) applied to the sample and displaced via a focused gas pulse prior to vacuum capture. Performed in triplicate.
Figure 13:
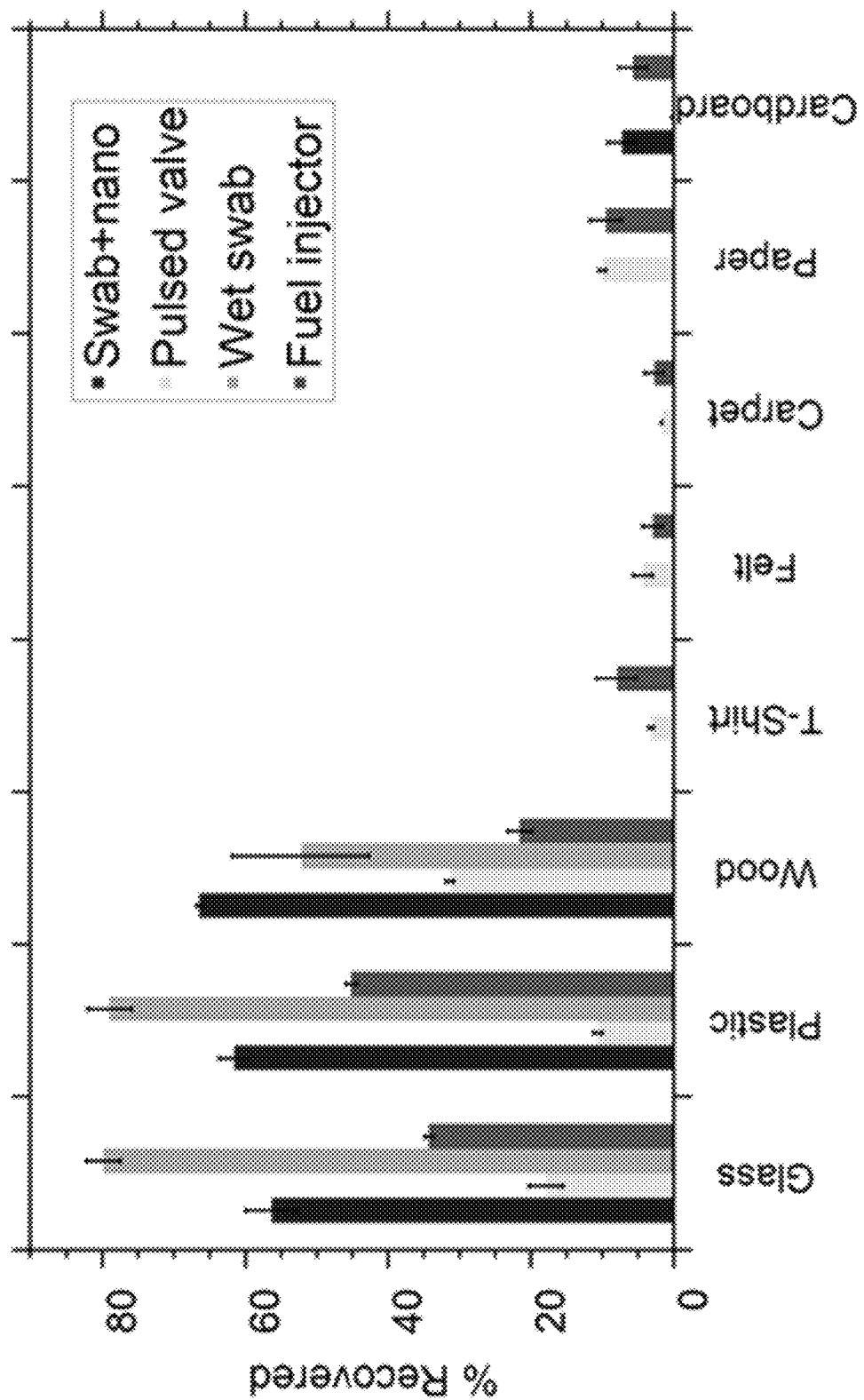
FIG. 13 provides results of combined surface analysis of samples using swabs with nanoparticles, pulse vale sampling, wet swab sampling and samples captured using the fuel injection valve. Performed in triplicate.

Various surfaces were sampled using the sampling device and analyzed with gas chromatography mass spectrometry to determine recovery of caffeine from samples deposited on glass, plastic, felt, wood, t-shirt, paper, carpet and cardboard (FIG. 12). Each sample surface was spiked with 2 μg of caffeine and 20 nm nanoparticle suspension (30 uL) prior to vacuum capture via a focused gas pulse. Tests were performed in triplicate. As described above, 60 psi gas pulse was applied to each sample for 15 to 20 shots per sample. Higher percentages of samples were collected from non-porous surfaces, but sample recovery was successful on textured and semi-porous surfaces, indicating that the device can be employed in a variety of scenarios to collect samples from real-world objects and surfaces such as those found at scenes of crime.

Surface analysis of the prototype sampling device described above was compared with that of existing sampling methods including using swabs with nanoparticles, pulse vale sampling, wet swab sampling, and samples captured using the fuel injection valve. Tests were performed in triplicate. A 1 μL aliquot of a 2 μg caffeine solution in acetonitrile (ACN) was deposited onto several surfaces and air dried. A nanoparticle suspension (30 uL) was applied and allowed to dry. After dying, each surface was subjected to various analysis methods (swabbing, pulsed valve analysis and the portable fuel injection analysis). The material captured in the filters from pulse valve analysis and portable sampling was eluted with 350 μL of ACN. The eluent was centrifuged at 15,000 rpm for 15 minutes. The supernatant was collected and subjected to gas chromatography mass spectrometry analysis. For swabbing experiments, the swabs were allowed to dry for 15 minutes After 15 minutes, 350 μL of ACN was placed into the vials containing the swabs and sonicated for 5 minutes. The swabs in the vials were vortexed for 30 s before removal of the swab tips. The swabs that contained nanoparticles were further centrifuged at 15,000 rpm. The supernatant was collected and subjected to gas chromatography mass spectrometry analysis. The total ion chromatograms affirmed the presence of caffeine in all of the samples when using a high pressure pulsed valve and the portable fuel injection system. The wet swabs and swabs with nanoparticles were able to detect caffeine on non-porous surfaces as well as cardboard (with nanoparticles), but no sample was detected using these methods on the other porous or textured surfaces. In contrast, the pulsed valve and fuel injector valve devices of the present disclosure recovered sample from all of the tested surfaces.

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

What is claimed is:

1. A method of particle sample collection, comprising:
   depositing extractive particles onto a sample present on a substrate, wherein at least a portion of the sample becomes coupled to a portion of the extractive particles to form sample particles;
   discharging high-pressure gas at the sample, thereby aerosolizing a portion of the sample particles to disperse aerosolized sample particles; and
   collecting a portion of the aerosolized sample particles onto a collection filter to form a collected sample.

2. The method of claim 1, wherein the discharging occurs via a high-pressure pulsed valve coupled to a gas flow system.

3. The method of claim 1, further comprising applying a solvent to the sample prior to the discharging of the high-pressure gas.

4. The method of claim 1, further comprising isolating sample particles from the collected sample.

5. The method of claim 1, wherein the collected sample is stored in a contamination-free environment at a temperature suitable for preservation.

6. The method of claim 1, wherein the aerosolized sample particles are about 1 micrometer or less.

7. The method of claim 2, wherein the discharging occurs at a pressure of about 10 PSIG to about 100 PSIG.

8. The method of claim 1, wherein the sample is selected from compounds of interest selected from the group consisting of: biological compounds, other organic compounds, and inorganic compounds.

9. The method of claim 8, wherein the compounds of interest comprise compounds selected from the group consisting of: DNA, a protein, a drug, a component of an explosive, and other chemical compounds.

10. The method of claim 1, wherein the extractive particles comprise silica microparticles or silica nanoparticles.

11. The method of claim 1, wherein the extractive particles are functionalized to facilitate selective binding to a target analyte, wherein the functionalized particles comprise surface ligands, antibodies, or DNA.

* * * * *